Jan. 13, 1931.  1,789,097
J. BILSKY, NOW BY CHANGE OF NAME J. G. BILLINGS
SPEED GOVERNOR DEVICE
Filed Dec. 12, 1927    2 Sheets-Sheet 1
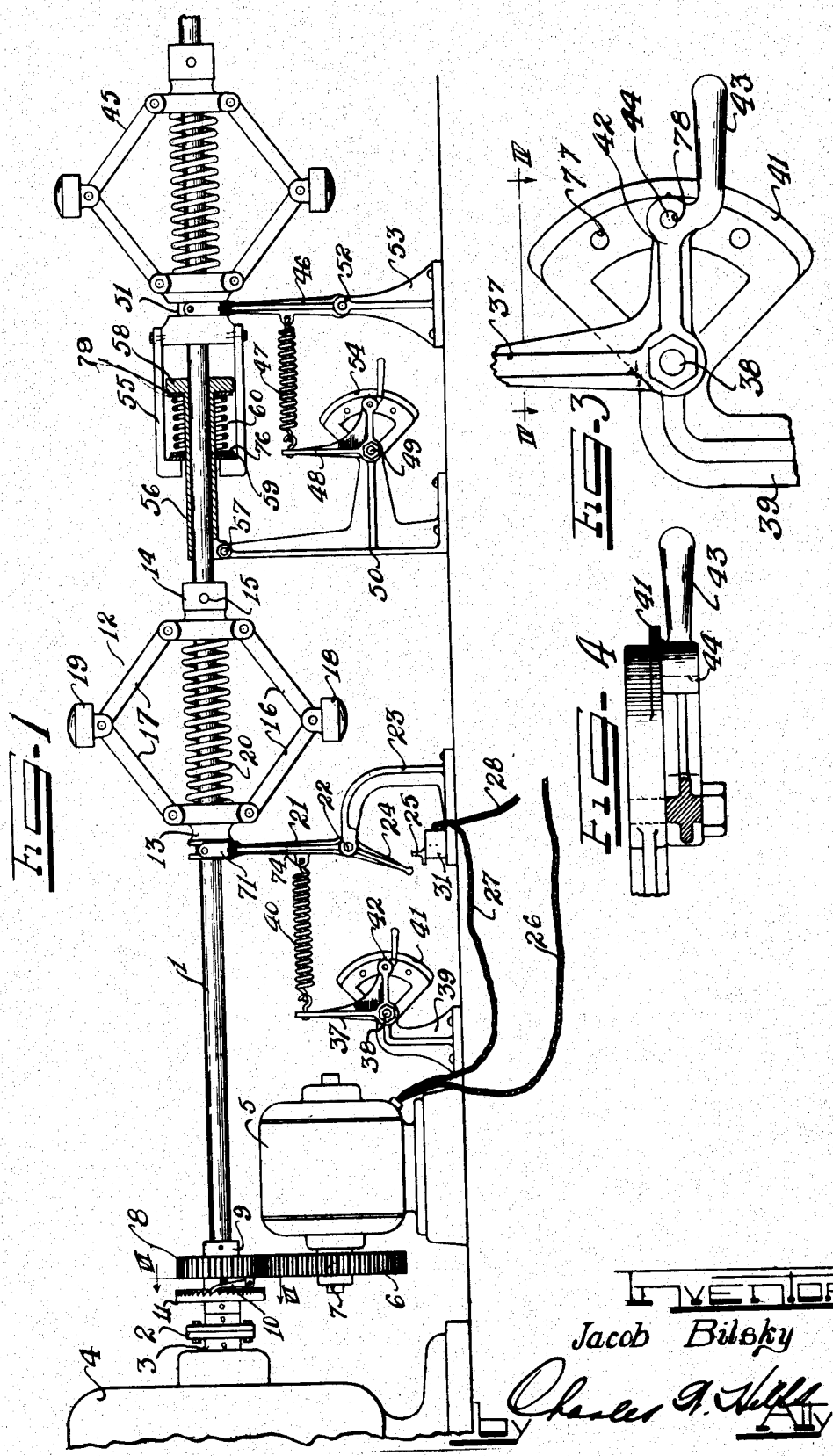
Inventor
Jacob Bilsky

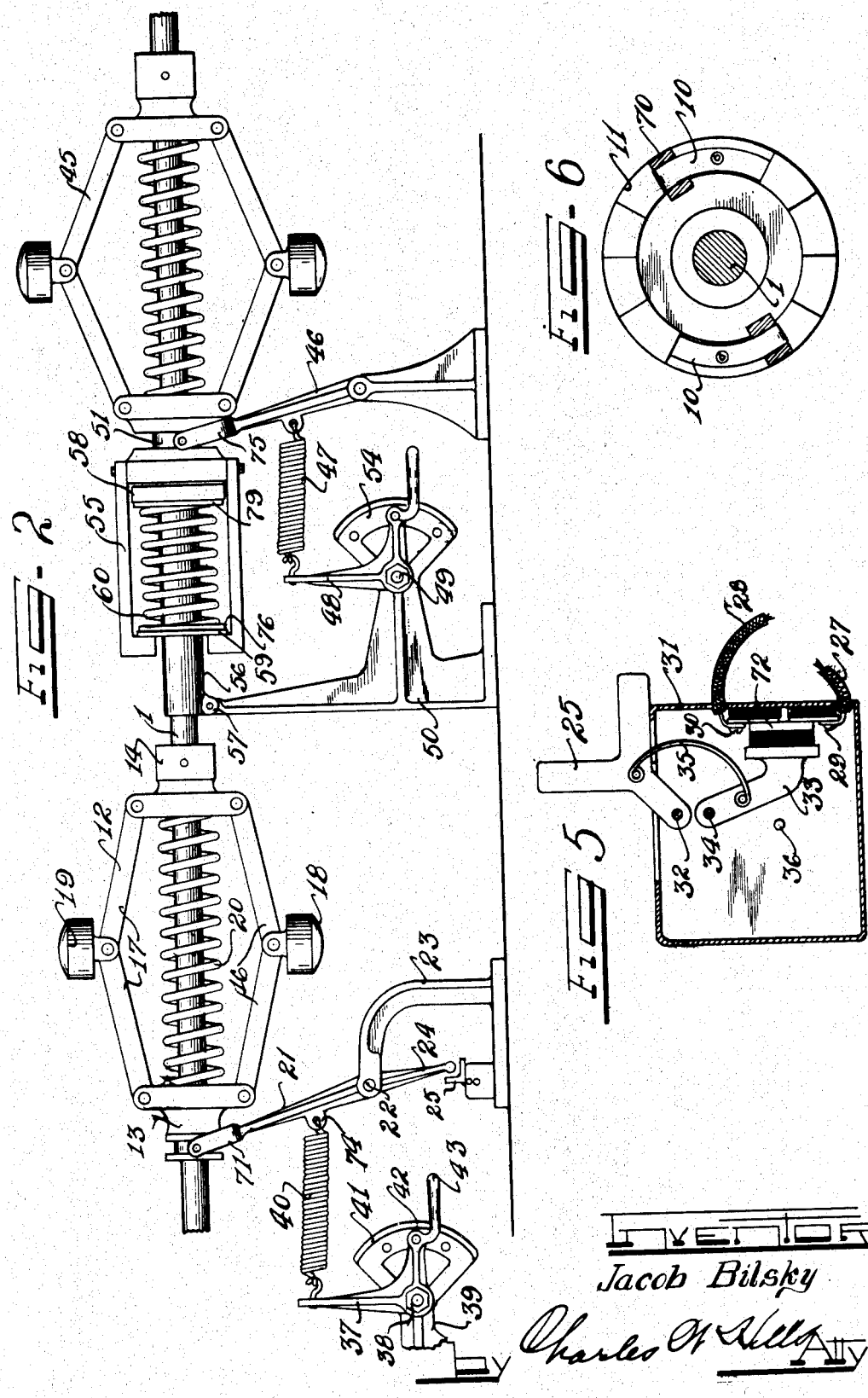

Patented Jan. 13, 1931

1,789,097

UNITED STATES PATENT OFFICE

JACOB BILSKY, OF CHICAGO, ILLINOIS, NOW BY CHANGE OF NAME JOHN GREGORY BILLINGS

SPEED-GOVERNOR DEVICE

Application filed December 12, 1927. Serial No. 239,387.

This invention relates to speed governing devices for controlling the speed of rotation of revolving members. More particularly it relates to an apparatus including a main and secondary source of power and speed responsive means for throwing into operation the secondary source of power when a rotating member driven by the primary source of power falls below a predetermined figure. The invention also contemplates the use of a second speed responsive means for retarding the speed of the driven shaft when the speed goes above a predetermined point, the two speed responsive means thus acting to control the speed of the driven shaft between definite limits.

It is, therefore, an object of this invention to provide a speed governor device comprising a pair of speed responsive means mounted upon a common shaft and adapted to control the speed of rotation of such shaft between definite and adjustable limits.

It is a further object of this invention to provide speed responsive means mounted upon a shaft adapted to be driven by a primary source of power, and to provide a secondary source of power adapted to be thrown in by the operation of said speed responsive means when the speed of rotation of said shaft falls below a predetermined lower limit, and to provide adjustable means associated with said speed responsive means to throw in said secondary source of power.

Other and further important objects of this invention will become apparent from the following description and appended claims.

This invention, in its preferred form, is illustrated in the accompanying drawings, wherein;

Figure 1 is a side elevational view of apparatus embodying the principles of my invention, with parts in section.

Figure 2 is an enlarged fragmentary side elevational view of the same, showing its operation.

Figure 3 is an enlarged detail view.

Figure 4 is a sectional view taken on line IV—IV of Figure 3.

Figure 5 is an enlarged cross sectional view of the operating switch.

Figure 6 is an enlarged sectional view taken on line VI—VI of Figure 1.

While my invention is applicable in general to the control of the speed of any revolving shaft, or other member provided with a main driving means and a secondary driving means adapted to be thrown in as an auxiliary power to the main driving means, it is here illustrated in connection with electric motors as the main and secondary driving means. A main shaft 1 is connected through a coupling 2 to the shaft 3 of a main motor 4. A secondary motor 5 is connected to said shaft 1 by means of a spur gear 6 mounted upon the secondary motor shaft 7 and adapted to mesh with a gear 8 loosely mounted upon the shaft 1. A collar 9 secured to said shaft 1 prevents the gear 8 from sliding upon the shaft 1 in one direction. A pair of spring-pressed pawls 10, (Fig. 6) pivotally mounted upon ears 70 formed on the opposite face of the gear 8 from the collar 9, are adapted to engage with the teeth of a ratchet wheel 11 secured to said shaft.

When the shaft 1 is being rotated by the main motor 4 and the secondary motor 5 is idle, it will be apparent that the pawls 10 will merely slide over the teeth of the ratchet wheel 11. However, since the motor 5 is geared to drive the shaft 1 at a higher rate of speed than the motor 4, when said motor 5 is running, the gear 8 will cause the pawls 10 to engage with the teeth of the ratchet wheel 11, and thus drive the shaft 1 at an increased rate of speed.

A speed responsive means, indicated as a whole by the reference numeral 12, is mounted upon said shaft 1 to control the operation of the secondary motor 5. Said speed responsive means 12 comprises a pair of spaced collars 13 and 14, said collar 14 being secured to the shaft 1, as by a set screw 15, and the other collar 13 being slidable upon said shaft. Pairs of pivotally connected links 16 and 17 connect said collars 13 and 14 and carry weights 18 and 19, respectively, pivoted at the respective joints formed between the members of said pairs of links. A coiled spring 20 is positioned between said collars 13 and 14 to exert an expanding force tending to keep said links 16 and 17 parallel to the shaft 1, as shown in Figure 2. When, however, the speed of the revolving shaft 1 is such as to cause the weights 18 and 19 to fly outwardly by reason of the centrifugal force acting upon them, the collars 13 and 14 tend to draw together and compress the spring 20, as shown in Figure 1.

The collar 13, which is slidably mounted upon the shaft 1, is pivotally connected through a yoke 71 to an arm 21, pivoted as at 22 to a bracket arm 23. Said arm 21 is provided with a lower extended end 24 adapted to actuate a Y-shaped switch lever 25. Said switch lever 25, as best shown in Figures 1 and 5, controls the secondary motor circuit comprised of wires 26, 27 and 28. Said wires 27 and 28 are connected to insulated terminals 29 and 30, respectively, positioned within a switch box 31. Said switch lever 25 is pivoted at its lower end upon a pin 32 also positioned in said switch box 31. A make and break arm 33, pivoted as at 34 and carrying an insulated contact strip 72 is connected by means of a resilient curved band 35 to said switch lever 25 in such a manner that operation of the switch lever 25 serves to actuate the make and break arm 33 to close and open the gap between the terminals 29 and 30. A stop 36 limits the backward throw of the make and break arm 33.

Means for controlling the speed at which the speed responsive means becomes operative to throw in the secondary motor 5 comprises an angular lever 37 pivoted as at 38 to a bracket arm 39 and connected at its upper end by means of an helical spring 40 to an intermediate point 74 on the arm 21. The tension of said spring 40 may be adjusted by setting the angular lever 37 in different positions as determined upon a graduated quadrant 41 formed on said bracket arm 39. For this purpose said angular lever 37 is provided with a pointer arm 42 (Figure 3) having an offset operating handle 43. The quadrant 41 may be provided with spaced holes 77 and the pointer arm 42 with a hole 78 to permit a pin 44 to be passed through said holes when in register to hold said lever 37 at any desired setting. Obviously, the quadrant 41 may be so calibrated as to indicate directly for any setting of the pointer arm 42 the speed of rotation of the shaft 1, at which the speed responsive means 12 becomes operative to throw in the motor 5.

It will thus be apparent that when the speed responsive means 12 is set to operate at any definite speed of the shaft 1, if, by virtue of an overload on the shaft 1, the speed of the motor 4 drops below the predetermined figure at which the speed responsive means is set, said speed responsive means will operate through the arm 21 to trip the switch lever 25 and close the circuit formed by the wires 27 and 28 in the secondary motor circuit. The motor 5 will accordingly be started up, and acting through the gears 6 and 8 and the pawls 10 and ratchet wheel 11 will apply power to the shaft 1 to bring the speed of said shaft 1 again to the predetermined figure. As soon as the point is again reached, the speed responsive means 12 draws the arm 21 in the opposite direction to trip the lever 25 back to open the switch and shut off the motor 5.

A second speed responsive means 45 is also mounted upon the shaft 1 for the purpose of applying a braking force to said shaft 1 when its speed of rotation goes above an upper set limit. Said speed responsive means 45 is in general similar in construction to the speed responsive means 12. In the case of the speed responsive means 45, however, it is ineffective at speeds lower than those for which it is set to operate. The free end of said means 45 is pivotally connected to a yoke 75 formed on the upper end of a rocking arm 46, said arm being in turn connected by means of a spring 47 to an angular lever 48 pivoted as at 49 to a bracket 50. Said arm 46 is pivoted at its upper end to a slidable collar 51 of the speed responsive means 45 and at its lower end is pivotally mounted as at 52 upon a stand 53. Accordingly, the spring 47 acts against the centrifugal force tending to throw the weights of the speed responsive means 45 outwardly. As before, the tension upon the spring 47 may be controlled by angular adjustment of the lever 48 with respect to a graduated quadrant 54.

Said slidable collar 51 is also connected to a hollow box 55 enclosing a portion of said shaft 1. A sleeve 56 pivoted as at 57 to the upper end of said bracket arm 50 is adapted to enclose said shaft 1 and to extend within said box 55. Said sleeve 56 is provided at its enclosed end with an enlarged head 58, between which and a friction plate 59 is mounted a compression spring 60. Said friction plate 59, which is secured to the end of the box 55, bears against a second friction disk 76. A third friction disk 79 is interposed between the end of the spring 60 and the enlarged head 58. When, therefore, the speed responsive means 45, due to the speed of rotation of the shaft 1, operates to move over the arm 46 against the tension of the spring 47, the revolving box 55 is similarly moved to compress the spring 60 and set up friction between the friction plates 59 and 76, and the friction disk 79 and head 58, thus acting as a brake to retard the speed of rotation of said shaft 1.

It will thus be apparent that by suitable adjustment of the angular levers 37 and 48 with respect to their graduated quadrants 41 and 54, the speed of the rotating shaft 1 may be controlled within narrow limits. If the speed of said shaft 1 falls below the lower limit set, as indicated upon the quadrant 41, the speed responsive means 12 operates to close the circuit of the secondary motor 5, and throw said motor 5 into operative relation to the shaft 1 and thereby bring the speed of the shaft 1 again within the prescribed limits. On the other hand, if the speed of the rotating shaft 1 exceeds the upper limit set on the quadrant 54, the speed responsive means 45 is rendered effective to exert a retarding force upon the rotating shaft 1 by virtue of the breaking action set up between the friction disks 59 and 76 and the disk 79 and head 58. There is thus provided automatic means for controlling the speed of a rotating shaft, or other rotating member, to obtain practically constant speed.

Such a device as above described finds application in any cases where it is desired to control the speed of rotation of a shaft within narrow limits. It will also be apparent that the speed responsive means 12 may be used alone to throw in an auxiliary source of power when the speed of a rotating shaft falls below a lower prescribed limit. This would enable the use of a main motor having a low starting torque, in which case the secondary motor would automatically throw in when the main motor was started up to bring the line shaft up to speed and then would automatically cut out.

I am aware that many changes may be made and numerous details of construction may be varied through a wide range without departing from the principles of this invention, and I, therefore, do not propose limiting the patent granted hereon otherwise than necessitated by the prior art.

I claim as my invention:

1. In combination, a revoluble shaft for connection to a driven load, a main electric motor connected to the shaft, an auxiliary electric motor normally disconnected from the shaft, switch means responsive to the speed of the shaft to energize the auxiliary motor, means in operative association with the shaft and the auxiliary motor responsive to the speed of the auxiliary motor to connect it to the shaft to assist the main motor during periods of abnormally heavy load torque on the shaft and to automatically disconnect the auxiliary motor when the shaft speed increases beyond a predetermined limit following a decrease in the load torque on the shaft.

2. In combination, a revoluble shaft for connection to a driven load, a main electric motor connected to the shaft, an auxiliary electric motor normally disconnected from the shaft, switch means responsive to the speed of the shaft to energize the auxiliary motor, means in operative association with the shaft and the auxiliary motor responsive to the speed of the motor to connect it to the shaft to assist the main motor during periods of abnormally heavy load torque on the shaft and to automatically disconnect the auxiliary motor when the shaft speed increases above a predetermined limit following a decrease in the load torque on the shaft, and means responsive to an increase in the speed of the shaft to apply a brake load to the shaft.

3. In combination, a revoluble shaft for connection to a driven load, a main electric motor connected to the shaft, an auxiliary electric motor normally disconnected from the shaft, switch means to energize the auxiliary motor, clutch means, including a toothed member and a normally trailing pawl in operative association with the shaft and the auxiliary motor arranged to connect the energized auxiliary motor to the shaft to assist the main motor during periods of abnormally heavy load torque on the shaft, and to automatically prevent the driving of the auxiliary motor by the main motor, when the speed of the shaft increases beyond a predetermined limit.

In testimony whereof I have hereunto subscribed my name at Chicago, Cook County, Illinois.

JACOB BILSKY.